May 17, 1938. C. D. CUTTING 2,117,706
TWO-BEARING UNIVERSAL JOINT
Filed Dec. 14, 1936 2 Sheets-Sheet 1
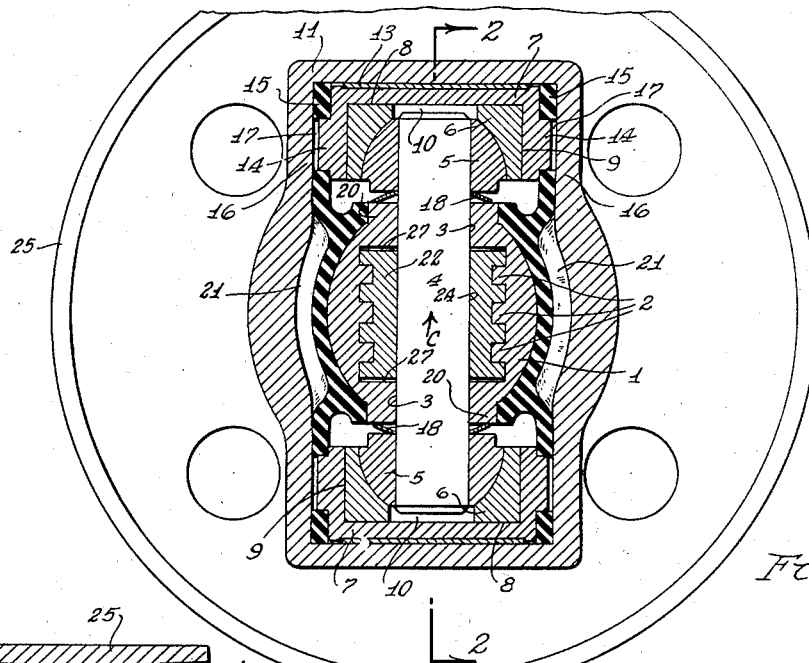
Fig. 1.
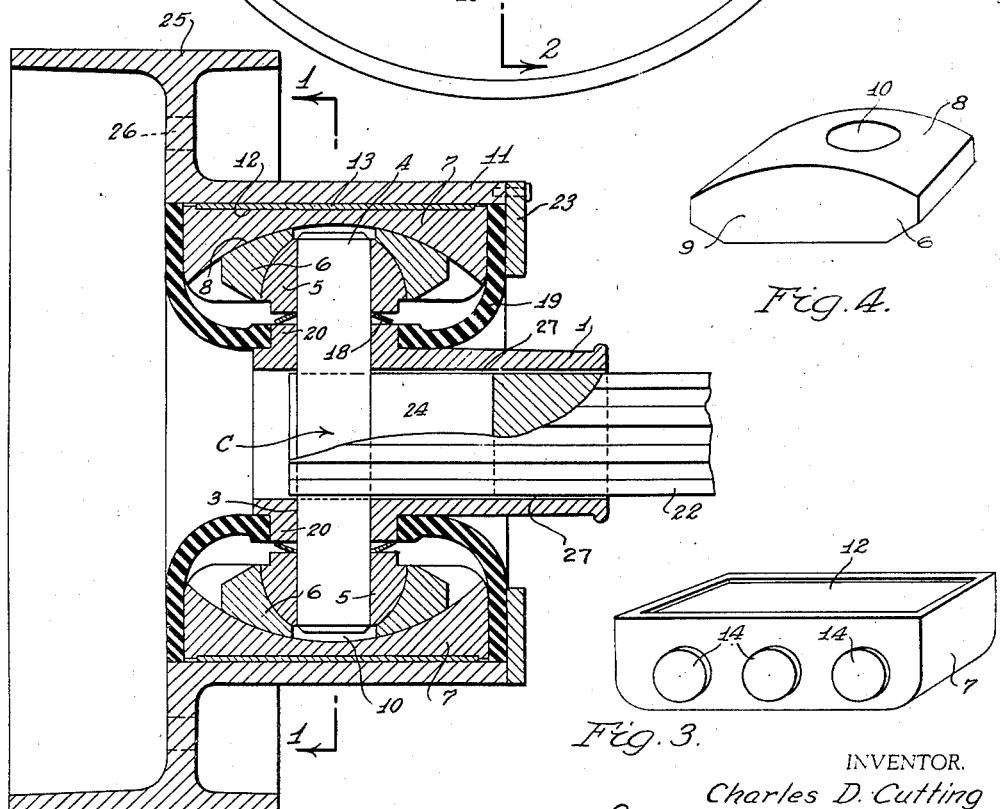
Fig. 2.
Fig. 4.
Fig. 3.
INVENTOR.
Charles D. Cutting
BY
ATTORNEY.

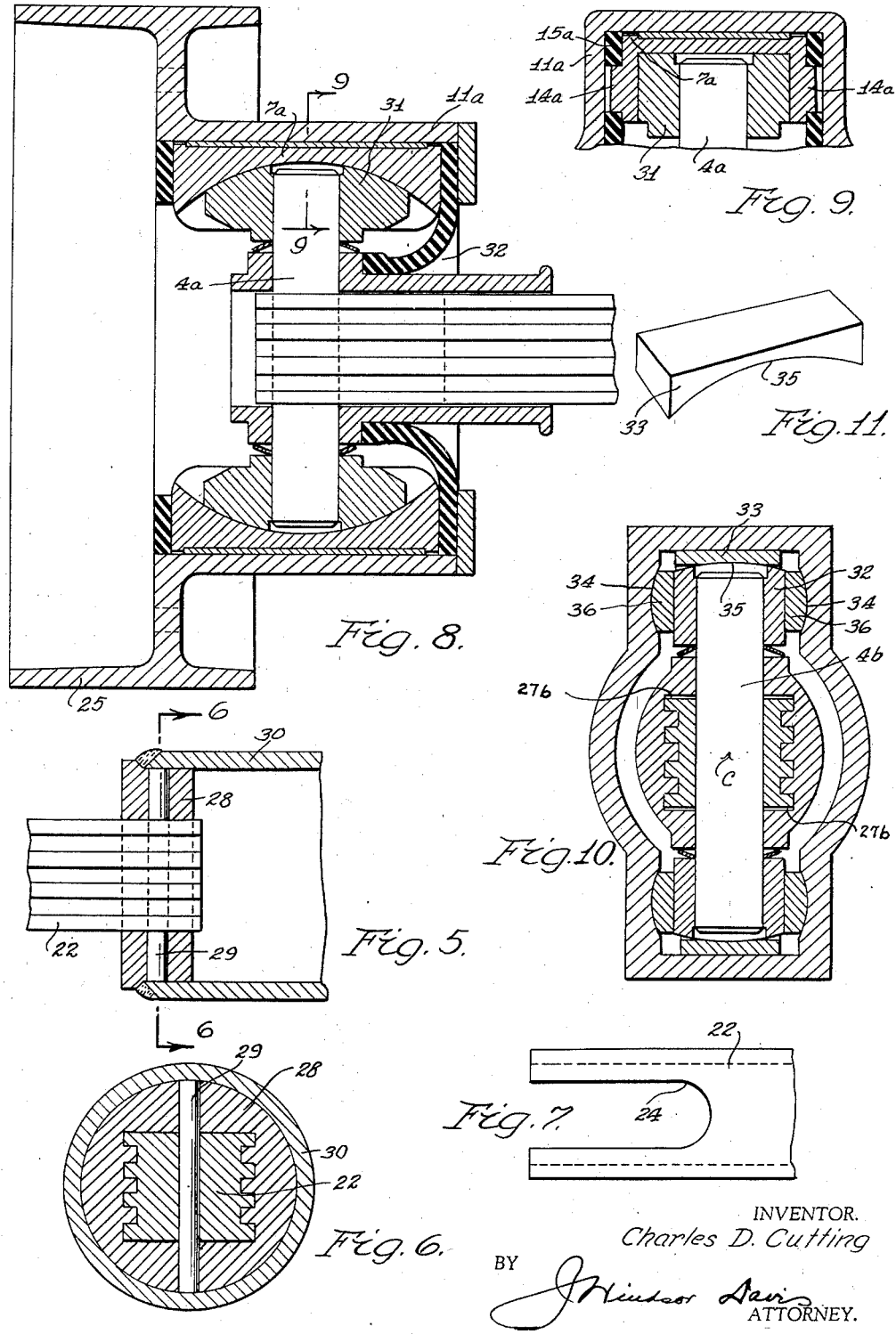

Patented May 17, 1938

2,117,706

UNITED STATES PATENT OFFICE 2,117,706

TWO-BEARING UNIVERSAL JOINT

Charles D. Cutting, Detroit, Mich., assignor to The Cutting Sales & Engineering Corporation, a corporation of Michigan Application December 14, 1936, Serial No. 115,680

16 Claims. (Cl. 64—7)

This invention relates to universal joints and has for its object to provide a single pin or two bearing type joint which is capable of performing all the functions of a four bearing joint with a consequent large saving in cost of production.

Another object is to provide a joint comprising a pin and a bushing within a bushing at each end thereof capable of giving all necessary universal movement.

Another object is to provide a housing, a splined yoke member which carries the pin, and dual bushing bearings between each end of the pin and the joint housing, this arrangement being such that all parts with the exception of the pin can be made by die casting as opposed to the conventional costly forgings.

Another object is to provide a joint comprising a pin, a spline shaft and two main members with the spline being so related to the pin that slippage occurs at the region of the dead center. This eliminates a considerable amount of metal which would necessarily be spaced from the center of the joint and obviates what is commonly called a "broken back" construction. Elimination of this additional weight of metal not only effects a substantial cost saving but renders the joint far easier to balance.

Another object is to provide a joint through which normal driving torque is transmitted by non-metallic surfaces without sacrificing reliability. More specifically it is the object in this respect to provide elastic cushions through which driving is accomplished, the cushions being protected by bumpers in such manner that they cannot be unduly stressed. The use of these cushions is optional and their omission will not otherwise alter the construction.

Another object is to provide an elastic sleeve for the joint, the outer end of which constitutes the cushions, above described, and which will serve the further purposes of a retainer for lubricant and a shield against the entry of dirt and other extraneous matter.

A further object is to provide a splined yoke member and a shaft therefor so shaped that the splining thereof can be completed by broaching thereby saving all hobbing costs.

A still further object is to provide a joint of the type above described the housing of which lends itself to incorporation in a brake drum. The housing and the brake drum can thus be made integrally and balancing thereof will be reduced to a single operation.

Other objects and advantages will become hereinafter more fully apparent as reference is had to the accompanying drawings wherein my invention is illustrated, by way of example, and in which Fig. 1 is a transverse section through this joint pin taken along the line 1—1 of Fig. 2, Fig. 2 is a longitudinal section taken along the line 2—2 of Fig. 1, Fig. 3 is a perspective view of the housing bushing, and Fig. 4 is a perspective view of the slide bushing, Fig. 5 is a longitudinal section through the connection of my improved spline and a propeller shaft, Fig. 6 is a transverse section taken along the line 6—6 of Fig. 5, Fig. 7 is a side elevation of the slotted end of the splined member, Fig. 8 is a view similar to Fig. 2 showing a modification of the bearing assembly, Fig. 9 is a detail showing of a bearing of Fig. 8 taken along the line 9—9 thereof, Fig. 10 is a section similar to Fig. 1 showing a further modification of the bearing assembly and housing, and Fig. 11 is a perspective view of the arcuate bushing of Fig. 10.

More particularly 1 indicates the yoke member splined internally at 2 and having transverse openings 3 near one end thereof to receive a pin 4 which extends a substantial distance outwardly of the yoke member at opposite sides thereof. At each end of the pin is a bearing assembly which consists of a substantially hemispherical bushing 5, a slide bearing 6 and a housing bushing 7 all of which may be suitably made of some bearing material such as compressed copper flour impregnated with oil.

The bushing 5 has a cylindrical interior surface for fitting engagement with the pin 4 and the exterior surface is of spherical shape for fitting engagement with the interior surface of the slide bushing 6 which is also of spherical shape. These two bushings therefore constitute a self centering means so that the pin 4 will have full bearing surface with the bushing 5. Galling of the pin and bushing because of localized driving contact will thus be precluded.

The outer peripheral surface 8 of the bushing 6 is of cylindrical shape with the radius thereof at the center C of the pin 4. The outer side walls 9 of this bushing are planar for close fitting driving engagement with the internal side walls of the bushing 7. An opening 10 is provided centrally through the cylindrical surface in the interests of lubrication and freedom against binding. The bushing 7 has an inner peripheral surface of cylindrical shape with the center of the cylinder also at the point C. The surface is longer than the engaging surface 8 of the bushing 6 and hence the bushing 6 is free to travel with respect thereto in sliding engagement. Thus if the yoke member 1 is moved through a vertical arc when in the position illustrated in Fig. 2, the pin 4 will rotate about the center C. The bushings 5 and 6 will move with the end of the pin, the bushing 6 sliding to a new position with respect to the bushing 7. Regardless of the position of the bushing 6 with respect to the bushing 7 the end of the main yoke member 1 may be swung through a horizontal arc in which case the pin 4 may rotate in the bushing 5 and the bushing 5 may rotate in the bushing 6.

The bushings 7 fit into the main housing member 11. The exterior surfaces thereof are of rectangular shape and may be planar but I prefer to provide a recess 12 for a non-metallic pad 13 which interrupts the metal to metal path through the joint at this region. The sides of this bushing 7 are provided with cylindrical projections 14 for extension into but not through elastic cushions 15 interposed between the bushing 7 and the side walls 16 of the main housing 11.

When driving torque is transmitted from the yoke to the housing, or vice versa, the cushions 15 will act as the torque transfer element unless the torque is sufficiently severe to compress the cushions to a greater amount than is permitted by the clearances 17 between the projections 14 and the walls 16. These projections 14 therefore act as bumpers and guard the cushions against destruction by over stressing. The cushions 15 may be omitted if desired, in which case the exterior walls of the bushing 6 or 7 could be made to fit closely against the walls 16. The cushions can well be omitted from one joint, as for instance, in cases where two joints are employed in the length of a single propeller shaft, or in any case where preferred. Since these cushions with the pad 13 break all metal to metal paths between the yoke member and its housing it is not particularly advantageous to interrupt the path of the short wave vibrations in more than one joint.

A retainer ring 23 is provided, as shown. In order to urge the bushing 7 into engagement with the housing and in order to maintain the bushings 5, 6 and 7 in slight pressure contact I interpose a deformed metallic shim between the member 1 and the bushing 5. Since the pin 1 has a pressed fit in the member 1 the joint is therefore not subject to rattling because of unrestricted clearances.

The cushions 15, as illustrated, constitute the outer ends of a flexible housing 19 for the bearing assemblies which serves as a retainer for lubricant and as a dust shield against the entry of extraneous matter thereto. This retainer fits closely around the nipples 20 of the yoke member 1 through which the pin 4 extends and is provided with a flexible flange or rib 21 to bridge the space between the yoke and the housing.

The interior of the yoke member 1 is preferably rectangular in cross-section with the two sides parallel to the pin 4 and internally splined at 2.

The shaft 22 which is inserted in the yoke member is also preferably of rectangular shape and splined only on opposite sides for engagement with the splines 2. This splining may be done without hobbing and hence a very large saving affected as compared to the cost where hobbing is necessary. Over seventy five per cent of the labor cost may thus be saved. The clearances 27 between the two planar surfaces of the yoke and shaft serve as lubricant paths. The shaft 22 is slotted at 24 at its outer end so that slippage may occur at the vicinity of the pin 4 and on each side thereof thereby materially shortening the length of the yoke 1 and precluding the necessity for the so-called "broken back" construction. The other end terminates in a splined connector 28 by a driving fit therewith. A pin 29 may also be added. The connector 28 is then secured to a propeller shaft 30 as by welding.

The housing 11 may be suitably, although not necessarily, cast integral with a brake drum 25. The advantage of combining the drum and the housing is that the drum and joint may be balanced at the same time. It will be noted that the length of the slot 24 is such that the end of the shaft 22 cannot project to the left, Fig. 2, by a sufficient amount to contact a plate which may be bolted to the web of the drum 2 through the holes 26.

In Fig. 8 the joint is similar to that just described except that instead of the bushings 5 and 6 a single bushing 31 is used. In this figure all parts are designated with numerals corresponding to those previously used with an "a" added. Full explanation will not be repeated except where changed.

The advantage of this construction is that it is more economical to make not only because the number of parts has been reduced without complication but also because the tolerances may be greater. The dust shield 32 has also been altered by omitting that portion of it on the left side as viewed in this figure, there being no requirement for it where the housing 11a is clamped to the adjoining member in such manner that dust can enter only from the right side.

In Fig. 9 the bearing assembly is seen in section normal to that of Fig. 8. The projections 14a terminate in a plane which lies at an angle of about two degrees with respect to the adjacent wall of the housing 11a so that the projections will have surface contact with this wall when the rubber cushion 15a has been compressed to its allowed maximum. This prevents brinelling of the cylindrical pin by localized loading.

In Fig. 10 another form of bearing assembly is illustrated. In this figure those parts corresponding to parts described in connection with Fig. 1 bear the corresponding numeral together with the letter "b". The pin 4b projects into a bushing 32 exactly similar in shape to the bushing 31. The bushing 32 is planar in plan view and arcuate in side elevation as shown in Fig. 11. The arc being described from the center c of the pin 4b. This bushing 33 does not have the dropped side walls as do the bushings 7 and 7a thereby leaving a space between the sides of the bushing 32 and the adjacent walls of the housing 16b. These adjacent walls are grooved cylindrically at 34 from a common axis 35 normal to the axis of the pin 4b when the pin is in center position. In each of these grooves is a bushing 36 each of which has one side formed on the arc of a cylinder to fit into a cylindrical groove 34 and its opposite side flat for surface contact with the driving side of the bushing 32. The flat sides are parallel with any element of the cylindrical grooves and normal to the direction of driving rotation.

What I claim is:—

1. A bearing assembly for a two bearing universal joint comprising three nesting bearing members the intermediate one of which has arcuate sliding engagement with the outer one thereof, and the inner one of which has rotative engagement with said intermediate one.

2. A universal joint comprising two main members, two trunnions carried by one of said members, and a bearing assembly between each of said trunnions and the other of said members comprising two bearing members one of which encircles said pin and has sliding engagement with the other of said bearing members, the contact surfaces of said members which provide for sliding contact being formed on an arc having its center at the center of the member which carries said trunnions, and a deformed metallic shim between the main member which carries said trunnions and said bushing assembly urging the parts of said assembly into pressure contact with each other and in firm assembly with respect to the other of said main members.

3. A two bearing universal joint comprising two main members, one of said members carrying trunnions, a bearing assembly for each of said trunnions comprising a bearing member rotatable with respect to its trunnion and having an exterior arcuate periphery and a second bearing member having an arcuate groove in the interior surface thereof in which the first named member slides, said groove extending in the direction of the axis of said main members when in coaxial position, and resilient means between said second member and the other of said main members through which driving forces are transmitted.

4. The combination as set forth in claim 3 wherein the exterior walls of said second members are slightly inclined with respect to the adjacent interior wall of said other main member when in unloaded relation.

5. The combination as set forth in claim 3 wherein the exterior surfaces of second members converge outwardly at an angle of approximately two degrees.

6. A two bearing universal joint comprising two main members, one of said members carrying trunnions, a bearing assembly for each of said trunnions comprising a bearing member rotatable with respect to its trunnion and having an exterior arcuate periphery and a second bearing member having an arcuate groove in the interior surface thereof in which the first named member slides, said groove extending in the direction of the axis of said main members when in coaxial position, and elastic cushioning elements separating said second member and the other of said main members and through which normal driving forces are transmitted.

7. In a two bearing universal joint, a yoke member carrying two trunnions, a bearing assembly for each of said trunnions comprising a bearing member rotatable with respect to its trunnion and having an exterior surface rectangular in a projected plane and of arcuate formation, a second bearing member having an arcuate groove formed in one surface for sliding engagement by the external surface of the first member, said second member having a rectangular external top portion, the external surfaces of said second member having projections extending therefrom, a main housing having walls through which driving forces are transmitted from said yoke member, said second member residing between said walls, and an elastic cushion between said second member and said walls having openings therethrough into which said projections extend.

8. The combination as set forth in claim 7 wherein the end surfaces of said projections line in planes normally slightly out of parallel with said walls.

9. In a two bearing universal joint, a yoke member carrying two trunnions, a bearing assembly for each of said trunnions comprising a bearing member rotatable with respect to its trunnion and having an exterior surface rectangular in a projected plane and of arcuate formation, a second bearing member having an arcuate groove formed in one surface for sliding engagement by the external surface of the first member, said second member having a rectangular external top portion, the external surfaces of said second member having projections extending therefrom, a main housing having walls through which driving forces are transmitted from said yoke member, said second member residing between said walls, an elastic cushion between said second member and said walls having openings therethrough into which said projections extend, and a non-metallic means separating said housing and the rectangular outer surface of said second member whereby metal to metal path through said joint is interrupted.

10. A universal joint comprising two main members, two trunnions carried by one of said members, and a bearing assembly between each of said trunnions and the other of said members comprising two bearing members one of which encircles said pin and has sliding engagement with the other of said members, the contact surfaces of said members which provide for sliding contact being formed on an arc having its center at the center of the member which carries said trunnions, said assembly being completely separated from said other main member by a non-metallic means.

11. A universal joint comprising two main members, two trunnions carried by one of said members, and a bearing assembly between each of said trunnions and the other of said members comprising two bearing members one of which encircles said pin and has sliding engagement with the other of said members, the contact surfaces of said members which provide for sliding contact being formed on an arc having its center at the center of the member which carries said trunnions, said other member being separated from said other main member by elastic cushioning means through which all driving and retarding forces are transmitted, said cushioning means being extended in length in the direction of the center of the joint and constituting means for preventing entry of extraneous matter to said assembly and means for preventing loss of lubricant therefrom.

12. A yoke member for a two bearing universal joint comprising a main member having a pin extending transversely therethrough to constitute trunnions, said main member having a rectangular opening extending longitudinally therethrough, the sides of said opening parallel with said pin being splined.

13. A two bearing universal joint comprising a yoke member having a pin projecting therethrough to form two trunnions, a bearing assembly for each of said trunnions comprising a bearing member having an arcuate peripheral surface, a second bearing member having an arcuate surface to receive said peripheral surface, said arcuate surface being longer than said peripheral surface, a member in contact with each driving side of said first named member having an exterior formed on the arc of a cylinder, and a housing, said housing having two trunnion bearing receiving portions each having oppositely disposed driving sides grooved on the arc of a cylinder to receive the arcuate sides of said members.

14. A universal joint comprising two main members, one of said members having a pin extending transversely therethru to constitute trunnions and being splined internally with the splines extending past said pin.

15. A yoke member for a universal joint having an internal opening to relieve a drive shaft, said opening being of rectangular cross-section with opposite side walls splined.

16. A yoke member for a two bearing universal joint having an internal longitudinal opening to receive a drive shaft, two opposite walls of said opening being splined and the other two walls thereof being planar.

CHARLES D. CUTTING.